United States Patent
Igarashi

(10) Patent No.: US 12,116,061 B2
(45) Date of Patent: Oct. 15, 2024

(54) STEERING CONTROL METHOD AND STEERING CONTROL DEVICE

(71) Applicant: Nissan Motor Co., Ltd., Yokohama (JP)

(72) Inventor: Kazuhiro Igarashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 40 days.

(21) Appl. No.: 17/632,458

(22) PCT Filed: Nov. 16, 2020

(86) PCT No.: PCT/JP2020/042547
§ 371 (c)(1),
(2) Date: Feb. 2, 2022

(87) PCT Pub. No.: WO2022/102112
PCT Pub. Date: May 19, 2022

(65) Prior Publication Data
US 2022/0355857 A1 Nov. 10, 2022

(51) Int. Cl.
*B62D 6/00* (2006.01)
*B60W 30/12* (2020.01)
*B62D 5/04* (2006.01)
*B62D 15/02* (2006.01)
*G01P 3/64* (2006.01)

(52) U.S. Cl.
CPC .......... *B62D 6/008* (2013.01); *B62D 15/021* (2013.01)

(58) Field of Classification Search
None
See application file for complete search history.

(56) References Cited

U.S. PATENT DOCUMENTS

| | | | |
|---|---|---|---|
| 11,059,514 B2 | 7/2021 | Kodera | |
| 2008/0149414 A1* | 6/2008 | Ogawa | B62D 5/008 701/41 |
| 2018/0086341 A1* | 3/2018 | Taniguchi | B62D 6/008 |
| 2019/0367079 A1 | 12/2019 | Kodera | |
| 2021/0114653 A1* | 4/2021 | Tsubaki | B62D 5/0409 |

FOREIGN PATENT DOCUMENTS

| | | |
|---|---|---|
| JP | 2006-137215 A | 6/2006 |
| JP | 2007-237938 A | 9/2007 |
| JP | 2014-151881 A | 8/2014 |
| JP | 2019-209789 A | 12/2019 |

* cited by examiner

Primary Examiner — Jonathan M Dager
Assistant Examiner — Laura E Linhardt
(74) Attorney, Agent, or Firm — Young Basile Hanlon & MacFarlane, P.C.

(57) ABSTRACT

A steering control method includes: detecting a steering angle of a steering wheel; calculating first steering reaction force which becomes greater when the detected steering angle is greater; calculating a delayed steering angle by delaying a phase of the detected steering angle; calculating second steering reaction force which becomes greater when an absolute value of a deviation angle being a deviation between the detected steering angle and the calculated delayed steering angle is greater; and applying steering reaction force based on a sum of the first steering reaction force and the second steering reaction force to the steering wheel.

5 Claims, 11 Drawing Sheets

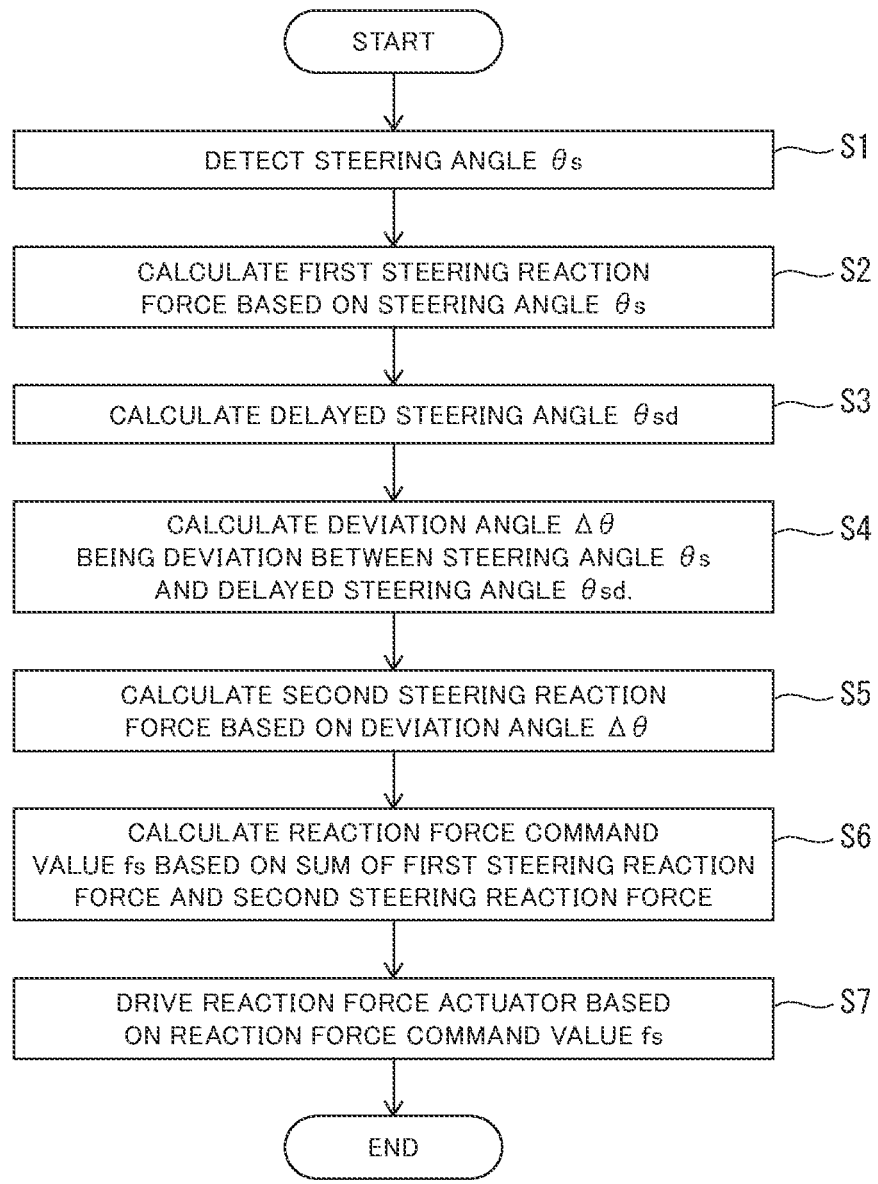

STEERING CONTROL METHOD AND STEERING CONTROL DEVICE

TECHNICAL FIELD

The present invention relates to a steering control method and steering control device.

BACKGROUND

JP 2019-209789 A describes a steer-by-wire type steering device in which a steering wheel and steered wheels are mechanically separated.

In a steer-by-wire type steering device, road surface reaction force received by the steered wheels from a road surface is not mechanically transmitted to the steering wheel. Therefore, some steer-by-wire steering devices apply steering reaction force to the steering wheel using an actuator.

SUMMARY

When a driver transitions the steering wheel from a state in which the steering wheel is rotating to a state in which the steering wheel is stopped (steering holding state), steering reaction force affects operability of the steering wheel.

It is desirable that the steering reaction force of an appropriate magnitude is maintained until the steering wheel is stopped at a desired steering angle, and that when the steering wheel is stopped, the steering reaction force quickly decreases and converges to a magnitude corresponding to the steering angle.

The steering reaction force can be generated by adding a transient component to a steady component corresponding to the steering angle of the steering wheel. The transient component is a component of the steering reaction force added to the steady component in response to a change in the steering angle. By adding the transient component, the steering reaction force while the driver is rotating the steering wheel can be appropriately strengthened, and in a steering holding state where the steering angle does not change, the steering reaction force can converge to the steady component corresponding to the steering angle. For example, JP 2019-209789 A describes applying the steering reaction force based on the steering angular velocity.

However, when the transient component is set based on the steering angular velocity, the driver may experience discomfort.

In other words, the steering angular velocity gradually decreases before the steering wheel stops. Therefore, the steering reaction force starts to decrease before the steering wheel stops because the transient component decreases as the steering angular velocity decreases. As a result, the force necessary to steer when the driver tries to stop the steering wheel may become weaker, and the steering angle when the steering wheel is stopped may be greater than the steering angle intended by the driver.

The purpose of the present disclosure is to increase the operability by making it easier to stop the steering wheel at a steering angle the driver desires when the driver transitions the steering wheel from a state in which the steering wheel is being rotated to a state in which the steering wheel is stopped.

According to an aspect of the present invention, there is provided a steering control method including: detecting a steering angle of a steering wheel; calculating first steering reaction force which becomes greater when the detected steering angle is greater; calculating a delayed steering angle by delaying a phase of the detected steering angle; calculating second steering reaction force which becomes greater when an absolute value of a deviation angle being a deviation between the detected steering angle and the calculated delayed steering angle is greater; and applying steering reaction force based on a sum of the first steering reaction force and the second steering reaction force to the steering wheel.

According to the aspect of the present invention, it is possible to increase the operability by making it easier to stop the steering wheel at a steering angle the driver desires when the driver transitions the steering wheel from a state in which the steering wheel is being rotated to a state in which the steering wheel is stopped.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 5 is a flowchart illustrating an example of a steering control method according to the embodiment;

DETAILED DESCRIPTION

Hereinafter, the embodiments of the present disclosure will be described with reference to the drawings. Each drawing is schematic, and may differ from the reality. The following embodiments of the present disclosure are examples of devices and methods for embodying the technological idea of the present disclosure, and the technological idea of the present disclosure does not limit the structure, arrangement and the like of the components to the following ones. The technological idea of the present disclosure may be modified in various ways within the technological scope defined by the claims.

First Embodiment

Figure 1:
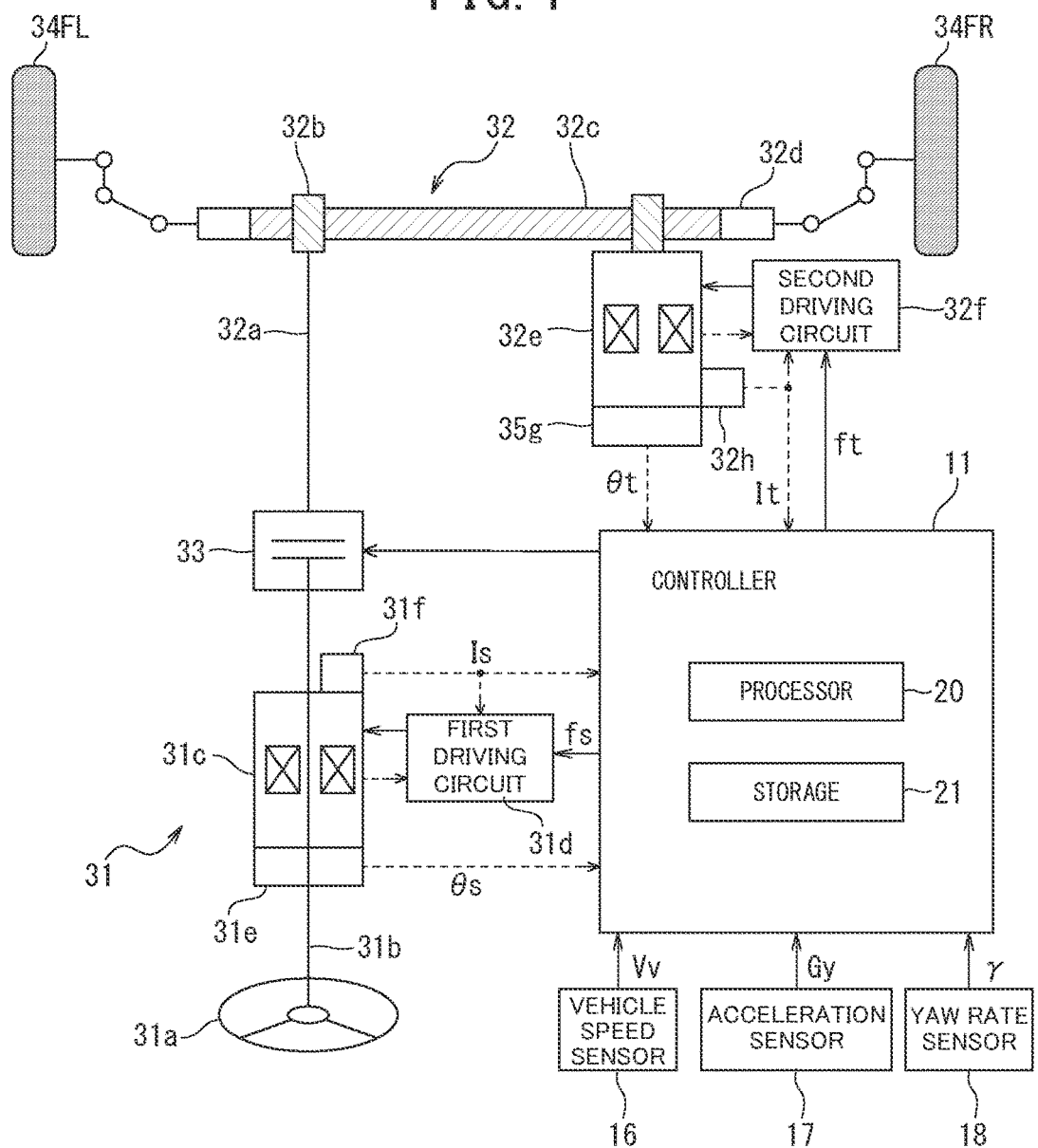
FIG. 1 is a schematic configuration diagram illustrating an example of a steering device according to the embodiment.

FIG. 1 is a schematic configuration diagram illustrating an example of a steering device according to the first to third embodiments installed in a vehicle.

The steering device according to the embodiments includes a steering unit 31 for accepting steering input by a driver, a turning unit 32 for turning left and right front wheels 34FL and 34FR being steered wheels, a backup clutch 33, and a controller 11.

The steering device adopts a steer-by-wire (SBW) system in which the steering unit 31 and the turning unit 32 are mechanically separated when the backup clutch 33 is released. In the description below, the left and right front wheels 34FL and 34 FR may be referred to as "steered wheels 34".

The steering unit 31 includes a steering wheel 31a, a column shaft 31b, a reaction force actuator 31c, a first driving circuit 31d, a steering angle sensor 31e, and a current sensor 31f.

The turning unit 32 includes a pinion shaft 32a, a steering gear 32b, a rack gear 32c, a steering rack 32d, a turning actuator 32e, a second driving circuit 32f, a turning angle sensor 32g, and a current sensor 32h.

The steering wheel 31a of the steering unit 31 is subjected to reaction force torque by the reaction force actuator 31c, and rotates in response to steering torque input by the driver. In this description, the reaction force torque applied to the steering wheel by the actuator may be referred to as "steering reaction force torque".

The column shaft 31b integrally rotates with the steering wheel 31a.

The reaction force actuator 31c may be an electric motor, for example. The reaction force actuator 31c includes an output shaft coaxially arranged with the column shaft 31b.

The first driving circuit 31d drives the reaction force actuator 31c based on a reaction force command value fs output from the controller 11. The reaction force command value fs is a command value of the steering reaction force torque (rotation torque to be applied to the steering wheel 31a, hereinafter also referred to as reaction force torque) to be applied to the steering wheel.

The steering angle sensor 31e detects a rotation angle of the column shaft, in other words, a steering angle θs (steering wheel angle) of the steering wheel 31a.

The current sensor 31f detects reaction force current Is being driving current of the reaction force actuator 31c.

The steering gear 32b of the turning unit 32 engages with the rack gear 32c, and turns the steered wheels 34 in accordance with the rotation of the pinion shaft 32a. A rack-and-pinion type steering gear or the like may be adopted as a steering gear 32b, for example.

The backup clutch 33 is arranged between the column shaft 31b and the pinion shaft 32a. When the backup clutch 33 is released, the steering unit 31 and the turning unit 32 are mechanically detached, and when fastened, the steering unit 31 and the turning unit 32 are mechanically connected.

The turning actuator 32e may be an electric motor such as a brushless motor, for example. The output shaft of the turning actuator 32e is coupled to the rack gear 32c via a speed reduction device.

The second driving circuit 32f drives the turning actuator 32e based on a turning force command value ft output from the controller 11. The turning force command value ft is a command value of turning torque for turning the steered wheels 34.

The turning angle sensor 32g detects an actual turning angle θt being the actual turning angle of the steered wheels 34.

The current sensor 32h detects turning current It being driving current of the turning actuator 32e.

The vehicle speed sensor 16 detects wheel speed of a vehicle mounted with the turning device according to the embodiment, and calculates speed of the vehicle speed Vv based on the wheel speed.

An acceleration sensor 17 detects lateral acceleration Gy of the vehicle.

A yaw rate sensor 18 detects a yaw rate γ of the vehicle.

The controller 11 is an electronic control unit (ECU) configured to control the turning of the steered wheels and performs a reaction force control of the steering wheel.

In this description, "reaction force control" refers to controlling of the steering reaction force torque applied to the steering wheel 31a by an actuator such as the reaction force actuator 31c. The controller 11 includes a processor 20 and a peripheral component such as a storage 21 and the like. The processor 20 may be a central processing unit (CPU), a micro-processing unit (MPU), or the like.

The storage 21 may include a semiconductor storage, a magnetic storage, and an optical storage. The storage 21 may include a register, cache memory, a memory used as a main storage such as a read only memory (ROM), a random access memory (RAM) or the like.

The controller 11 may be realized by a functional logic circuit set up in a general-purpose semiconductor integrated circuit. The controller 11 may include a programmable logic device (PLD) or the like such as a field-programmable gate array (FPGA).

Figure 2:
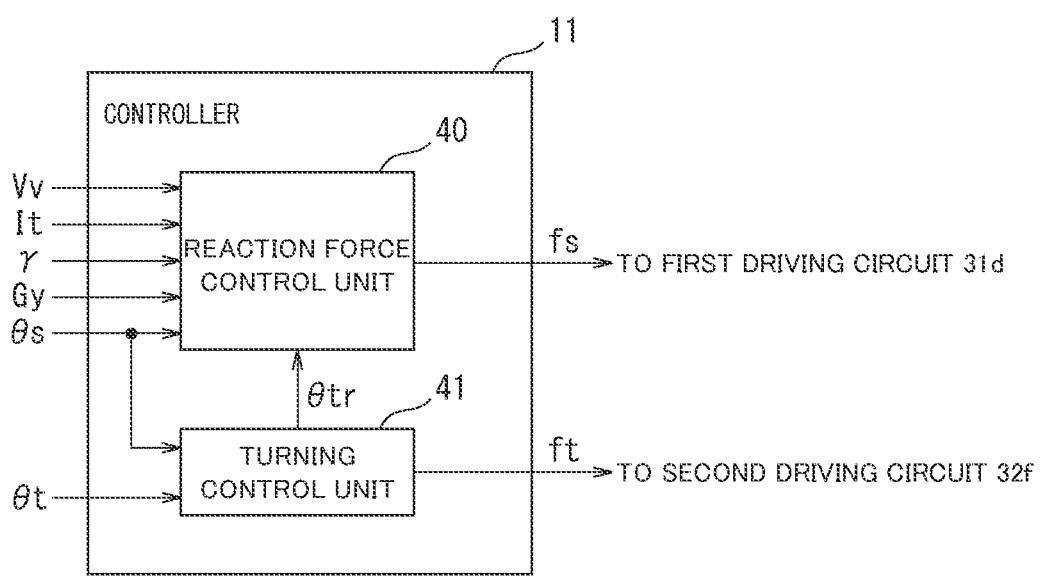
FIG. 2 is a block diagram illustrating a functional configuration example of a controller illustrated in FIG. 1.

FIG. 2 is a block diagram illustrating a functional configuration example of the controller 11. The controller 11 includes a reaction force control unit 40 and a turning control unit 41. The functions of the reaction force control unit 40 and the turning control unit 41 may be realized by a processor 20 executing a program stored in the storage 21 of the controller 11, for example.

The turning control unit 41 calculates the turning force command value ft based on the steering angle θs of the steering wheel 31*a* and the actual turning angle θt of the steered wheels 34.

Particularly, the turning control unit 41 sets a target turning angle θtr being a target of the turning angle of the steered wheels 34, based on the steering angle θs.

The turning control unit 41 calculates the turning force command value ft for matching the actual turning angle θt to the target turning angle θtr based on a difference (θtr−θt) of the actual turning angle θt and the target turning angle θtr.

The turning control unit 41 outputs the turning force command value ft to the second driving circuit 32*f*. The second driving circuit 32*f* drives the turning actuator 32*e* based on the turning force command value ft.

The turning actuator 32*e* outputs turning torque for turning the steered wheels 34 to the steering rack 32*d*, based on the current command output from the second driving circuit 32*f*.

The second driving circuit 32*f* controls the current command output to the turning actuator 32*e* by using torque feedback for matching actual steering torque estimated by the turning current It being the driving current of the turning actuator 32*e* and the turning torque indicated by the turning force command value ft output from the turning control unit 41. Alternatively, the current command output to the turning actuator 32*e* may be controlled by current feedback for matching the turning current It and driving current corresponding to the turning force command value ft.

The reaction force control unit 40 calculates the reaction force command value fs in response to the steering angle θs detected by the steering angle sensor 31*e*, the vehicle speed Vv detected by the vehicle speed sensor 16, the lateral acceleration Gy detected by the acceleration sensor 17, the yaw rate γ detected by the yaw rate sensor 18, the turning current It detected by the current sensor 32*h*, and the target turning angle Gtr set by the turning control unit 41.

The reaction force control unit 40 outputs the reaction force command value fs to the first driving circuit 31*d*. The first driving circuit 31*d* drives the reaction force actuator 31*c* based on the reaction force command value fs.

The reaction force actuator 31*c* outputs rotation torque to be applied to the steering wheel 31*a* to the column shaft 31*b*, in accordance with the current command output from the first driving circuit 31*d*. By applying the rotation torque, the steering reaction force torque generates in the steering wheel 31*a*.

The first driving circuit 31*d* controls the current command to be output to the reaction force actuator 31*c* by using torque feedback for matching the actual steering reaction force torque estimated by reaction force current Is being the driving current of the reaction force actuator 31*c* and reaction force torque indicated by the reaction force command value fs output from the reaction force control unit 40. Alternatively, the current command output to the reaction force actuator 31*c* may be controlled by current feedback for matching the reaction force current Is and the driving current corresponding to the reaction force command value fs.

Next, the steering reaction force applied to the steering wheel 31*a* by the reaction force actuator 31*c* will be described.

Figure 3A:
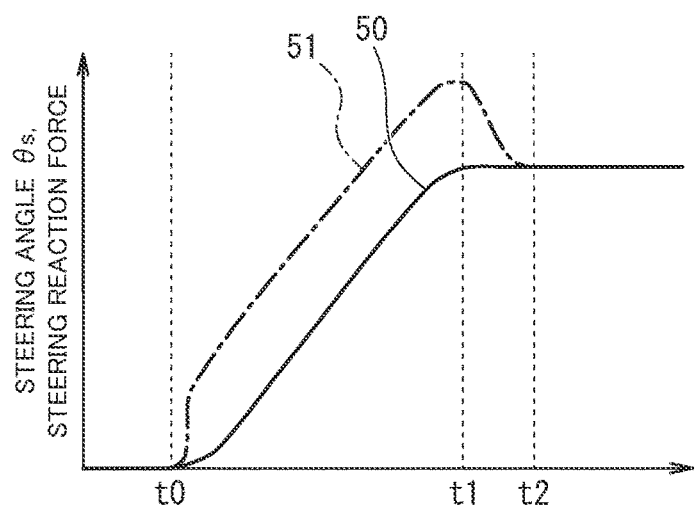
FIG. 3A is a timing diagram illustrating an example of preferable steering reaction force.

FIG. 3A is a timing diagram illustrating an example of the preferable steering reaction force. The solid line represents the steering angle θs, and the alternate long and short dash line represents the steering reaction force. In FIG. 3A, the two different parameters of the steering angle θ and the steering reaction force are represented on a single vertical axis for ease of understanding, however, these are parameters with different units, and needless to say, each parameter with different units of the steering angle θ and the steering reaction force actually has respective vertical axis. This is similar in FIGS. 3B and 3C described later. In the embodiment, as well as in the following drawings, for ease of understanding, a plurality of parameters in different units may be represented by a single vertical axis for convenience.

Generally, the steering reaction force preferably has the following characteristics 1 to 4.

(Characteristic 1) When steering starts at time t0, the steering reaction force starts to increase before the vehicle behavior occurs in an initial period of steering, and increases to a sufficient strength.

(Characteristic 2) During the steering operation (time t0 to t1), the steering reaction force has an inclination corresponding to the increase/decrease of the steering angle θs, and the vehicle behavior is easy to foresee.

(Characteristic 3) At time t1, when transitioning from a state in which the steering wheel 31*a* is rotating to a state in which the steering wheel 31*a* is stopped (steering holding state), until the steering wheel 31*a* is stopped at the desired steering angle, the steering wheel 31*a* is easy to be stopped at the desired steering angle because the steering reaction force of an appropriate magnitude is maintained.

(Characteristic 4) When the steering wheel 31*a* is stopped to be in a steering holding state, the steering reaction force rapidly decreases, and converges to a magnitude corresponding to the steering angle at time t2, and steering wheel 31*a* becomes easy to hold.

In the description below, the steering reaction force corresponding to the steering angle in the steering holding state may be referred to as "steering holding force".

Figure 3B:
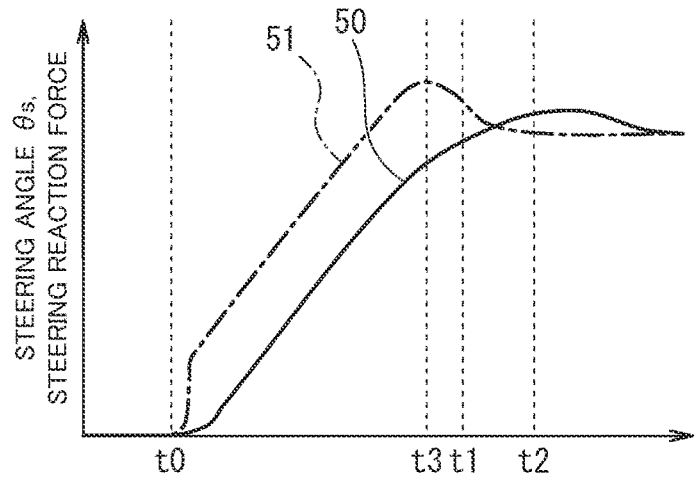
FIG. 3B is a timing diagram illustrating a case where the steering reaction force transitioned early to holding force when transitioning to a steering holding state.

FIG. 3B is a timing diagram illustrating a case where transitioning of the steering reaction force to the steering holding force happens too early when transitioning to a steering holding state.

The driver tries to stop the steering wheel 31*a* at the desired steering angle at time t1, however, the steering reaction force starts to decrease at an earlier time t3. As a result, when the driver tries to stop the steering wheel 31*a*, the steering reaction force being the force against the force applied by the driver becomes weak, and the steering angle θs becomes greater than the driver intended.

For example, when the steering reaction force is generated by adding a transient component corresponding to steering angular velocity ω of the steering wheel 31*a* to a steady component corresponding to the steering angle θs, the steering angular velocity ω gradually decreases before the steering wheel stops. Therefore, the steering reaction force starts to decrease before the steering wheel 31*a* stops because the transient component decreases as the steering angular velocity ω decreases.

Figure 3C:
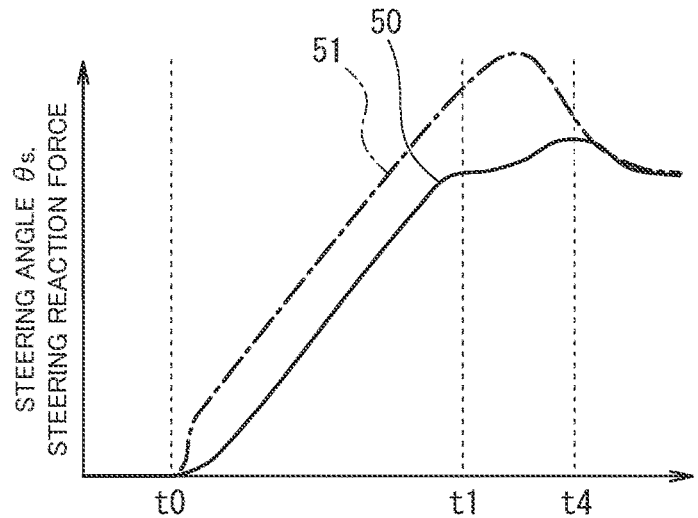
FIG. 3C is a timing diagram illustrating a case where transitioning the steering reaction force to the holding force is delayed when transitioning to a steering holding state.

FIG. 3C is a timing diagram illustrating a case where transitioning of the steering reaction force to the steering holding force happens too late when transitioning to a steering holding state.

The driver tries to stop the steering wheel 31*a* at the desired steering angle at time t1, however, the steering reaction force starts to decrease at a later time t4. As described above, when the steering reaction force decreases with a delay, the driver unexpectedly rotates the steering wheel 31*a* with the force the driver is applying to the steering wheel 31*a* to hold the steering wheel, and therefore the steering angle θs becomes greater than the driver intended.

Therefore, the steering reaction force preferably has the above-described characteristics 3 and 4 in order to easily stop the steering wheel at the desired steering angle (increase the operability).

Accordingly, the reaction force control unit 40 according to the embodiment calculates a delayed steering angle θsd in which a phase is delayed with respect to the steering angle θs, and calculates a transient component of the steering reaction force based on a deviation angle Δθ=θs−θsd being a deviation between the steering angle θs and the delayed steering angle θsd. Particularly, the reaction force control unit 40 calculates a transient component of the steering reaction force which becomes greater when the deviation angle Δθ is greater.

Figure 4A:
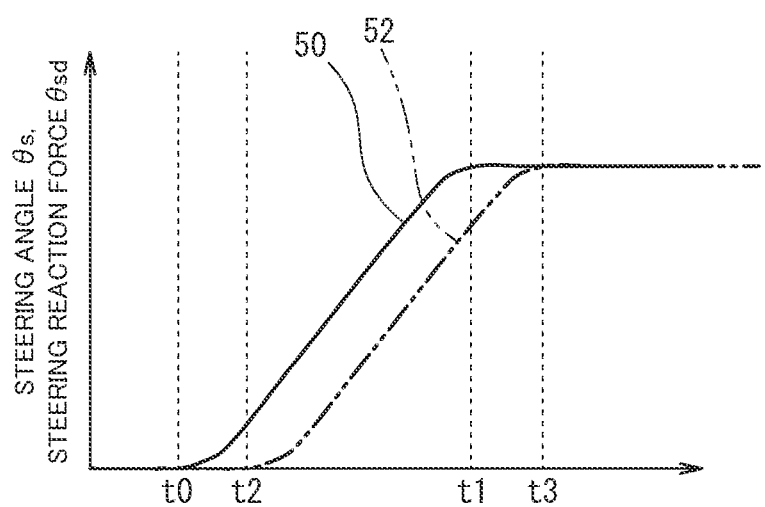
FIG. 4A is a timing diagram illustrating an example of the steering angle and a delayed steering angle.

FIG. 4A is a timing diagram illustrating an example of the steering angle θs and the delayed steering angle θsd. The solid line 50 represents the steering angle θs and the alternate long and two short dashes line 52 represents the delayed steering angle θsd.

The phase of the delayed steering angle θsd is delayed with respect to the steering angle θs. Therefore, the delayed steering angle θsd starts to increase at time at which the steering angle θs starts to increase, in other words, time t2 being later than the steering start time t0.

The delayed steering angle θsd reaches the steering angle θs and stops increasing at time t3 being later than the time t1 when the steering angle θs stops increasing, in other words, the time when the steering wheel 31a stops.

Figure 4B:
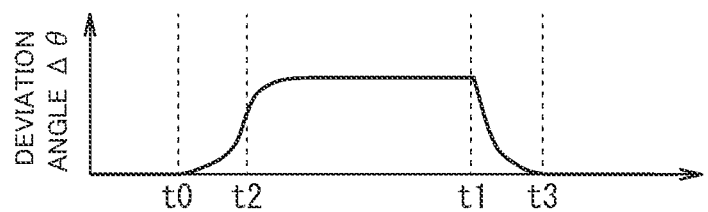
FIG. 4B is a timing diagram illustrating an example of a deviation angle.

FIG. 4B illustrates the deviation angle Δθ=θs−θsd between the steering angle θs and the delayed steering angle θsd.

The deviation angle Δθ increases during a period from the steering start time t0 to the time t2 when the delayed steering angle θsd starts to increase, and subsequently has a value corresponding to the phase delay of the delayed steering angle θsd.

The deviation angle Δθ decreases to zero during a period from the time t1 when the steering wheel 31a stops to the time t3 when the delayed steering angle θsd reaches the steering angle θs and stops increasing.

Figure 4C:
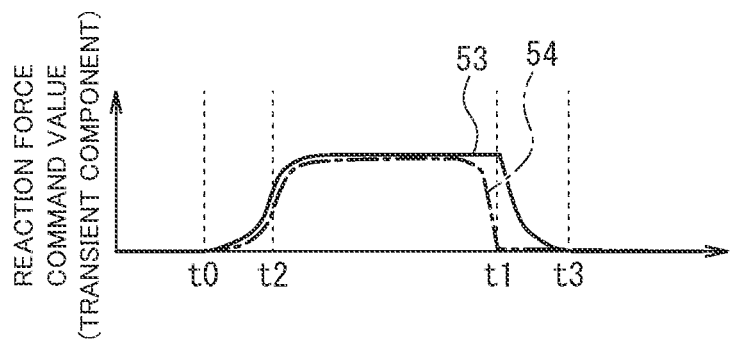
FIG. 4C is a timing diagram illustrating an example of a transient component of a reaction force command value.

FIG. 4C is a timing diagram illustrating an example of the transient component of the reaction force command value calculated based on the deviation angle Δθ. The solid line 53 represents the transient component calculated based on the deviation angle Δθ.

Similarly to the above-described deviation angle Δθ, the transient component starts to increase from the steering start time t0, and has a magnitude corresponding to the phase delay of the delayed steering angle θsd during the increase of the steering angle θs, in other words, during rotation of the steering wheel 31a. The transient component starts to decrease at time t1 when the steering wheel 31a stops, and converges to zero at the time t3.

The transient component calculated based on the steering angular velocity ω is illustrated with an alternate long and short dash line 54 for comparison. The transient component (an alternate long and short dash line 54) calculated based on the steering angular velocity ω is compared with the transient component (a solid line 53) calculated based on the deviation angle Δθ.

The transient component calculated based on the steering angular velocity ω decreases before time t1 when the steering wheel 31a stops because of the decrease of the steering angular velocity ω. On the contrary, the transient component (the solid line 53) calculated based on the deviation angle Δθ starts to decrease at a delayed time t1 when the steering wheel 31a stops, and quickly converges to zero after time t1.

Figure 4D:
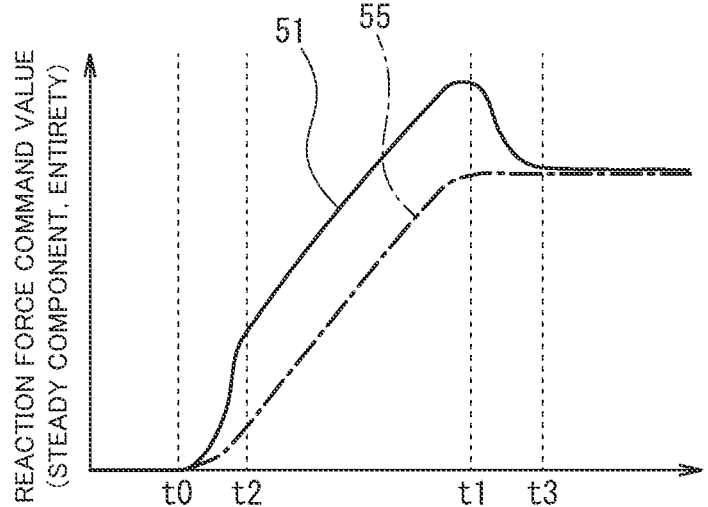
FIG. 4D is a timing diagram illustrating an example of a steady component of the reaction force command value and the overall reaction force command value.

Refer to FIG. 4D. The reaction force control unit 40 calculates the reaction force command value fs based on a sum of the transient component of the steering reaction force illustrated with the solid line 53 in FIG. 4C and the steady component of the steering reaction force corresponding to the steering angle θs.

The alternate long and short dash line 55 represents the steady component corresponding to the steering angle θs, and the solid line 51 represents the total steering reaction force obtained by adding the transient component represented by the solid line 53 in FIG. 4C to the steady component represented by the alternate long and short dash line 55. The reaction force control unit 40 sets the steady component to be greater when the steering angle θs is greater.

The start of decrease of the steering reaction force (the solid line 51) can be delayed until time t1 when the steering wheel 31a stops because the start of decrease of the transient component delays. As a result, the steering reaction force with appropriate strength can be maintained.

Since the transient component decreases after time t1, the steering reaction force (the solid line 51) quickly decreases when the steering wheel 31a stops, and therefore the steering reaction force can converge to the steady component (alternate long and short dash line 55).

As described above, when the steering wheel 31a is being transitioned to a steering holding state, the steering reaction force applied by the reaction force control unit 40 according to the embodiment is maintained in an appropriate magnitude until the steering wheel 31a is stopped at the desired steering angle.

When the steering wheel 31a stops, the steering reaction force quickly decreases and converges to a magnitude corresponding to a steering angle. As a result, the steering wheel 31a becomes easier to hold.

FIG. 5 is a flowchart illustrating an example of a steering control method according to the embodiment.

In the step S1, the steering angle sensor 31e detects the steering angle θs of the steering wheel 31a.

In the step S2, the reaction force control unit 40 calculates, based on the steering angle θs, the first steering reaction force which becomes greater when the steering angle θs is greater, as a steady component of the steering reaction force.

In the step S3, the reaction force control unit 40 calculates the delayed steering angle θsd being delayed in the phase with respect to the steering angle θs.

In the step S4, the reaction force control unit 40 calculates the deviation angle Δθ=θs−θsd between the steering angle θs and the delayed steering angle θsd.

In the step S5, the reaction force control unit 40 calculates, based on the deviation angle Δθ, the second steering reaction force which becomes greater when the deviation angle Δθ is greater, as a transient component of the steering reaction force.

In the step S6, the reaction force control unit 40 calculates a reaction force command value fs based on the total steering reaction force obtained by adding the first steering reaction force and the second steering reaction force.

In the step S7, the first driving circuit 31d drives the reaction force actuator 31c based on the reaction force command value fs, and applies the steering reaction force to the steering wheel.

Afterwards, the process terminates.

Figure 6:
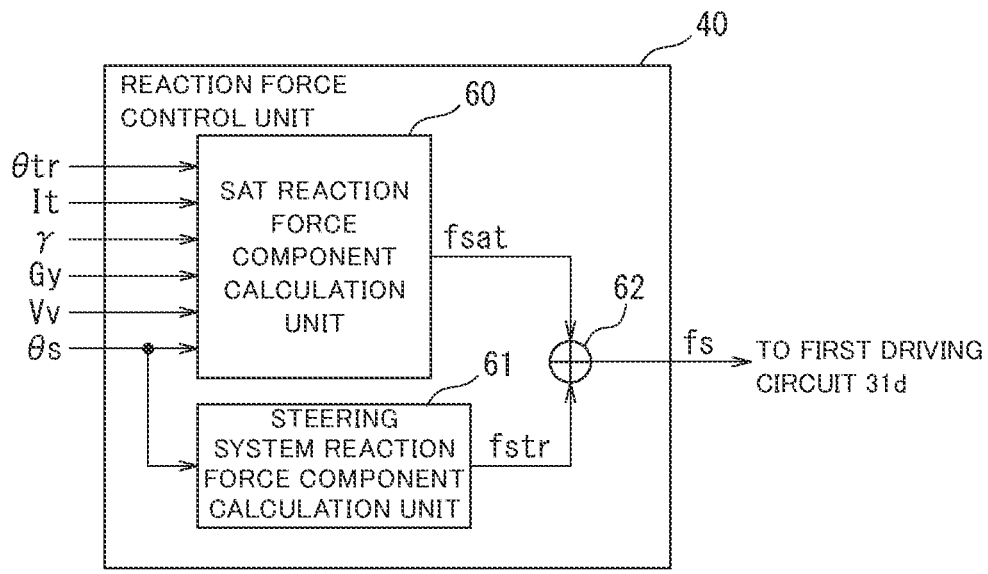
FIG. 6 is a block diagram illustrating an example of a functional configuration of a reaction force control unit according to the first embodiment.

The details of the reaction force control unit 40 according to the first embodiment will be described. FIG. 6 is a block diagram of an exemplary functional configuration of a reaction force control unit 40 according to the first embodiment.

The reaction force control unit 40 according to the first embodiment calculates the first steering reaction force (in other words, the steady component of the steering reaction force) and the second steering reaction force (in other words, the transient component of the steering reaction force) as the components included in the Self-Aligning Torque (SAT).

The reaction force control unit 40 may calculate the steering reaction force due to the road surface reaction force received by the steered wheels 34 form a road surface as the first steering reaction force, for example.

The reaction force control unit 40 may calculate the steering reaction force due to torsion during turning of a member (the steered wheels 34, a suspension, and the like) closer to the road surface than the steering rack 32d as the second steering reaction force.

The reaction force control unit 40 includes an SAT reaction force component calculation unit 60, a steering system reaction force component calculation unit 61, and an adder 62.

The SAT reaction force component calculation unit 60 calculates an SAT reaction force component fsat being a component simulating steering reaction force generated from the SAT.

The SAT reaction force component calculation unit 60 calculates the SAT reaction force component fsat based on the steering angle θs detected by the steering angle sensor 31e, the vehicle speed Vv detected by the vehicle speed sensor 16, the lateral acceleration Gy detected by the acceleration sensor 17, the yaw rate γ detected by the yaw rate sensor 18, the turning current It detected by the current sensor 32h, and the target turning angle θtr set by the turning control unit 41.

The steering system reaction force component calculation unit 61 calculates a steering system reaction force component fstr being a component simulating steering reaction force due to frictional force acting to the steering unit 31, viscous resistance, torsion of the steering unit 31, and the like.

The steering system reaction force component calculation unit 61 calculates the steering system reaction force component fstr based on the steering angle θs. The steering system reaction force component calculation unit 61 may calculate the steering system reaction force component fstr based on the vehicle speed Vv and the target turning angle θtr in addition to the steering angle θs.

The adder 62 calculates the reaction force command value fs by adding the SAT reaction force component fsat and the steering system reaction force component fstr.

Figure 7:
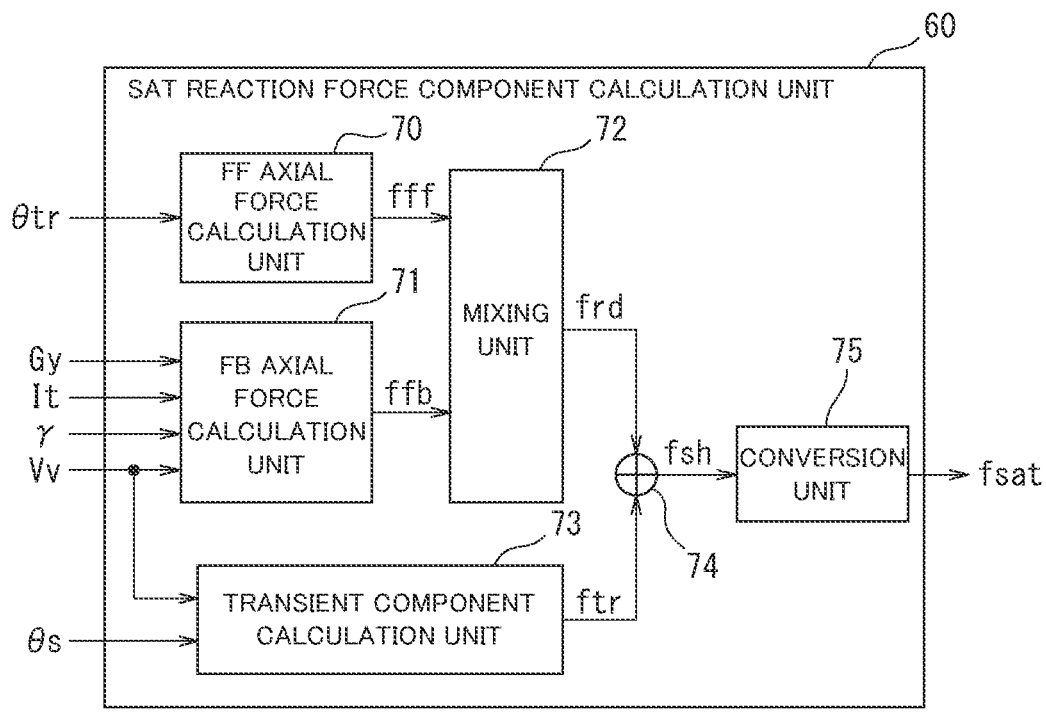
FIG. 7 is a block diagram illustrating an example of a functional configuration of a self-aligning torque (SAT) reaction force component calculation unit according to the first embodiment.

FIG. 7 is a block diagram illustrating an exemplary functional configuration of the SAT reaction force component calculation unit 60 according to the first embodiment. The SAT reaction force component calculation unit 60 includes a feedforward (FF) axial force calculation unit 70, a feedback (FB) axial force calculation unit 71, a mixing unit 72, a transient component calculation unit 73, an adder 74, and a conversion unit 75.

The FF axial force calculation unit 70 calculates, as FF axial force fff, steering rack axial force given by a following equation (1) based on the target turning angle θtr set by the turning control unit 41. The steering rack axial force is rack axial force acting on the steering rack 32d.

$$fff=(Ks+Css)/(JrS^2+(Cr+Cs)s+Ks)kV/(1+\Delta V^2)\cdot\theta tr+Ks(Jrs^2+Crs)/(JrS^2+(Cr+Cs)s+Ks)\theta tr \quad (1)$$

Ks is pinion rigidity, Cs is pinion viscosity, Jr is rack inertia, Cr is rack viscosity, k and A are predetermined constants.

The FB axial force calculation unit 71 calculates, based on the lateral acceleration Gy detected by the acceleration sensor 17, the steering rack axial force given by a following equation (2) as lateral G axial force.

$$(\text{Lateral } G \text{ axial force})=(\text{front wheel load})\times(\text{lateral acceleration } Gy)\times(\text{link ratio}) \quad (2)$$

Link ratio is a constant determined in accordance with a link angle and a suspension.

The FB axial force calculation unit 71 selects the steering rack axial force given by a following equation (3) as current axial force, based on the turning current It detected by the current sensor 32h, a torque constant of a motor of the turning actuator 32e, a motor gear ratio, a pinion gear diameter, and an efficiency.

$$(\text{Current axial force})=(\text{turning current } Id)\times(\text{motor gear ratio})\times(\text{torque constant})/(\text{pinion diameter})\times(\text{efficiency}) \quad (3)$$

The FB axial force calculation unit 71 calculates the steering rack axial force given by a following equation (4) as yaw rate axial force, based on the vehicle speed Vv detected by the vehicle speed sensor 16 and the yaw rate γ detected by the yaw rate sensor 18.

$$(\text{Yaw rate axial force})=(\text{front wheel load})\times(\text{vehicle speed } Vv)\times(\text{yaw rate } \gamma)\times(\text{link ratio}) \quad (4)$$

The FB axial force calculation unit 71 calculates the steering rack axial force given by a following equation (5) as the FB axial force ffb.

$$ffb=(\text{lateral } G \text{ axial force})\times K1+(\text{current axial force})\times K2+(\text{yaw rate axial force})\times K3 \quad (5)$$

K1, K2, and K3 are predetermined distribution ratios.

The mixing unit 72 calculates steering rack axial force (hereinafter referred to as "road surface component frd") generated from road surface reaction force by a following equation (6), based on FF axial force fff calculated by the FF axial force calculation unit 70 and FB axial force ffb calculated by the FB axial force calculation unit 71.

$$(\text{Road surface component } frd)=(FF \text{ axial force } fff)\times GF-(FB \text{ axial force } ffb)\times(1-GF) \quad (6)$$

GF is a mixing ratio.

The transient component calculation unit 73 calculates a transient component ftr of the steering rack axial force. The transient component calculation unit 73 calculates the steering rack axial force generated due to torsion during turning of a member (the steered wheels 34, a suspension, and the like) closer to the road surface than the steering rack 32d as the transient component ftr. The details of the transient component calculation unit 73 will be described later.

The adder 74 calculates final steering rack axial force fsh by adding the transient component ftr to the road surface component frd.

The conversion unit 75 converts the steering rack axial force fsh to the SAT reaction force component fsat. For example, the conversion unit 75 may read the SAT reaction force component fsat corresponding to the vehicle speed Vv and the steering rack axial force fsh from an axial force-steering reaction force conversion map. The axial force-steering reaction force conversion map is a map in which the steering reaction force corresponding to the steering rack axial force is set for each vehicle speed Vv, for example.

The steering reaction force converted from the road surface component frd is an example of the first steering reaction force being reaction force which becomes greater when the turning angle (in other words, the steering angle) is greater, and the steering reaction force converted from the transient component ftr is an example of the second steering reaction force.

Figure 8A:
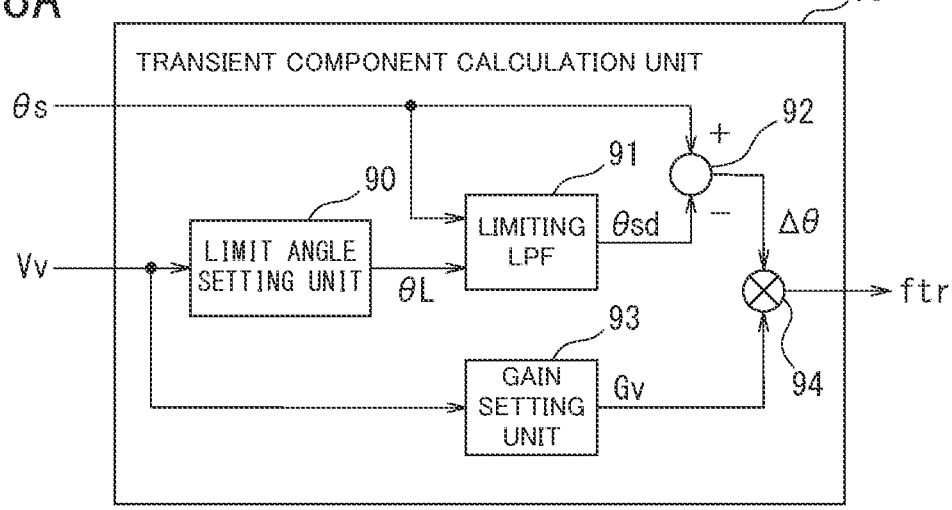
FIG. 8A is a block diagram illustrating an example of a functional configuration of a transient component calculation unit illustrated in FIG. 7.

The details of the transient component calculation unit 73 will be described. FIG. 8A is a block diagram illustrating an exemplary functional configuration of a transient component calculation unit 73.

The transient component calculation unit 73 calculates a delayed steering angle $\theta sd$ in which a phase is delayed with respect to the steering angle $\theta s$, and calculates a transient component ftr based on a deviation angle $\Delta\theta = \theta s - \theta sd$ being a deviation between the steering angle $\theta s$ and the delayed steering angle $\theta sd$.

The transient component calculation unit 73 includes a limit angle setting unit 90, a limiting low pass filter (LPF) 91, a subtracter 92, a gain setting unit 93, and a multiplier 94.

The limit angle setting unit 90 sets a limit angle $\theta L$ being an upper limit of an absolute value of the deviation angle $\Delta\theta$. By setting an upper limit to the deviation angle $\Delta\theta$, the transient component ftr can be prevented from becoming excessive. The limit angle $\theta L$ is an example of a "predetermined value" described in the claims.

For example, the limit angle setting unit 90 may set the limit angle $\theta L$ to become greater when the vehicle speed Vv is greater. The limit angle setting unit 90 may set the limit angle $\theta L$ to a constant value when the vehicle speed Vv is equal to or above a threshold value.

Figure 8B:
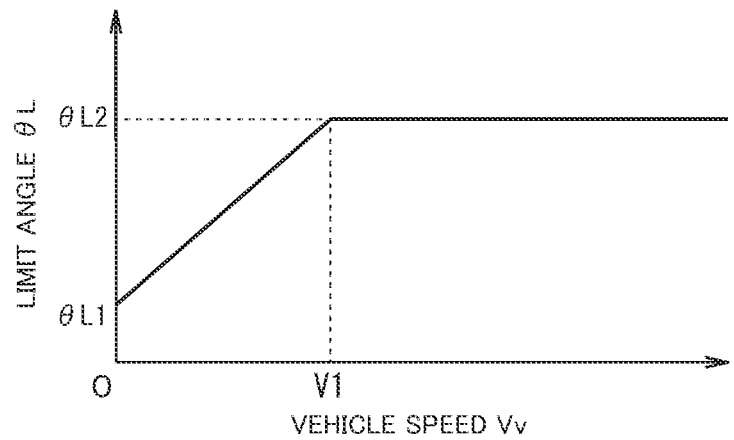
FIG. 8B is an explanatory diagram of an example of a characteristic of a limit angle.

FIG. 8B is an explanatory diagram of an exemplary characteristic of a limit angle $\theta L$. As the vehicle speed Vv increases from 0 to V1, the limit angle $\theta L$ increases from $\theta L1$ to $\theta L2$. When the vehicle speed Vv is equal to or above the threshold value V1, the limit angle $\theta L$ is a constant value $\theta L2$.

Refer to FIG. 8A. The limiting LPF 91 calculates the delayed steering angle $\theta sd$ in which the phase of the steering angle $\theta s$ is delayed in accordance with the limit angle $\theta L$. Particularly, the limiting LPF 91 limits the phase delay in the delayed steering angle $\theta sd$ with respect to the steering angle $\theta s$, to prevent the absolute value of the deviation angle $\Delta\theta = \theta s - \theta sd$ from exceeding the limit angle $\theta L$.

Figure 8C:
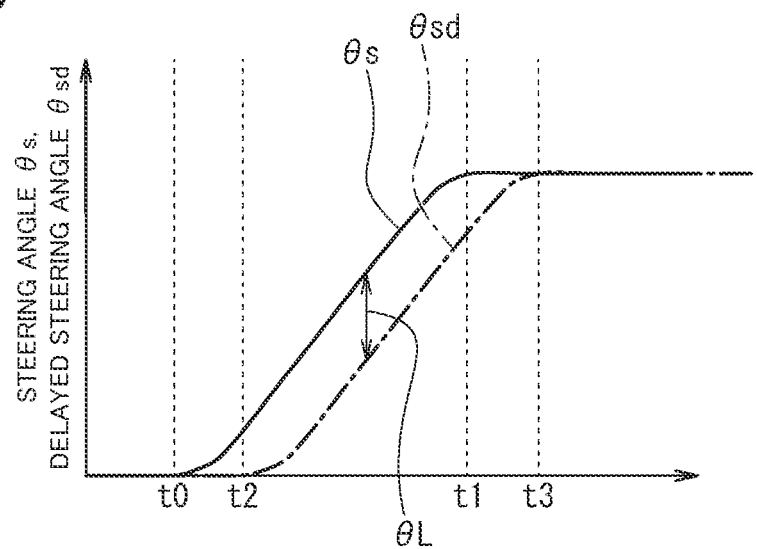
FIG. 8C is an explanatory diagram of a relation between the limit angle and phase delay.

The relation between the limit angle $\theta L$ and the phase delay of the delayed steering angle $\theta sd$ is illustrated in FIG. 8C. The solid line represents the steering angle $\theta s$ and the alternate long and two short dashes line represents the delayed steering angle $\theta sd$. By limiting the phase delay of the delayed steering angle $\theta sd$ with respect to the steering angle $\theta s$, the absolute value of the deviation angle $\Delta\theta = \theta s - \theta sd$ between the steering angle $\theta s$ and the delayed steering angle $\theta sd$ can be limited to equal to or less than the limit angle $\theta L$.

For example, in the limiting LPF 91, the steering angle $\theta s$ is input to a normal LPF, and when the absolute value $|\theta s - \theta lpf|$ of the deviation between the input $\theta s$ and the output $\theta lpf$ of the LPF is below the limit angle $\theta L$, the output $\theta lpf$ of the LPF is output as the delayed steering angle $\theta sd$.

When the deviation $(\theta s - \theta lpf)$ between the input $\theta s$ and the output $\theta lpf$ is equal to or above the limit angle $\theta L$, the limiting LPF 91 limits the value of the delayed steering angle $\theta sd$ to $(\theta s - \theta L)$ and outputs the value. When the deviation $(\theta s - \theta lpf)$ is below $(-\theta L)$, the limiting LPF 91 limits the value of the delayed steering angle $\theta sd$ to $(\theta s + \theta L)$ and outputs the value.

The limiting LPF 91 updates the previous output $\theta lpf$ of the LPF to a value after limitation.

Figure 9:
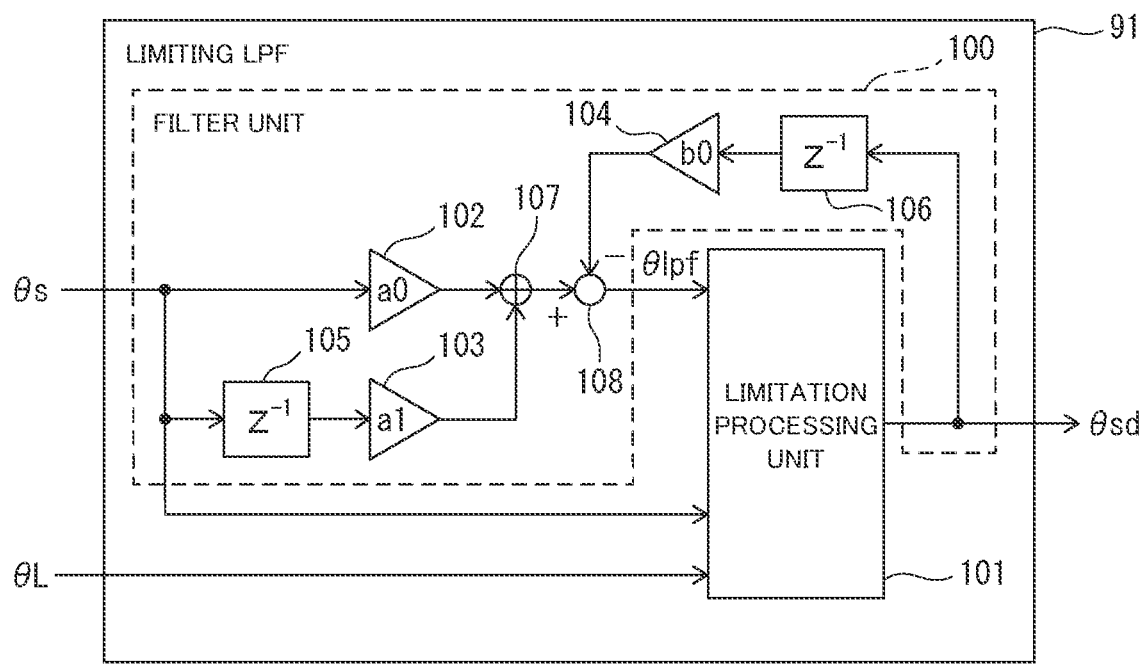
FIG. 9 is a block diagram of an example of a functional configuration of a limiting low pass filter (LPF) illustrated in FIG. 8A.

FIG. 9 is a block diagram illustrating a functional configuration example of a limiting LPF 91 illustrated in FIG. 8A. The limiting LPF 91 includes a filter unit 100 being a standard LPF and a limitation processing unit 101.

The steering angle $\theta s$ is input to the filter unit 100. The filter unit 100 applies a low pass filter to the steering angle $\theta s$ being the input, and outputs the result. The limitation processing unit 101 limits the output $\theta lpf$ of the filter unit 100, and outputs the signal after limitation as the delayed steering angle $\theta sd$.

The filter unit 100 includes multipliers 102, 103, and 104, delay elements 105 and 106, an adder 107, and a subtracter 108. The filter unit 100 in this example is a first-order LPF, however, another arbitrary LPF can be utilized, without limiting the present invention.

The multiplier 102 calculates a product of the steering angle $\theta s$ being the input to the filter unit 100 and a coefficient a0, and inputs the result to the addition unit 107. The delay element 105 delays the steering angle $\theta s$ by a unit time and outputs the result. The multiplier 103 calculates a product of the output of the delay element 105 and the coefficient a1, and inputs the result to the addition unit 107.

Meanwhile, the delay element 106 delays the delayed steering angle $\theta sd$ (in other words, a previous output value of the limiting LPF 91) output from the limitation processing unit 101 by a unit time and outputs the result. The multiplier 104 calculates the product of the output of the delay element 106 and the coefficient b0, and inputs the result to the subtraction unit 107.

The subtracter 107 subtracts the output of the multiplier 104 from the output of the addition unit 107, and outputs the subtraction result $\theta lpf$.

The limitation processing unit 101 limits the output $\theta lpf$ of the filter unit 100 by the limit angle $\theta L$, and outputs the signal after limitation as the delayed steering angle $\theta sd$.

Particularly, when the absolute value $|\theta s - \theta lpf|$ of the deviation between the steering angle $\theta s$ being the input to the filter unit 100 and the output $\theta lpf$ is below the limit angle $\theta L$, the output $\theta lpf$ of the LPF is output as the delayed steering angle $\theta sd$.

When the deviation $(\theta s - \theta lpf)$ between the input $\theta s$ and the output $\theta lpf$ is equal to or above the limit angle $\theta L$, the limiting LPF 91 limits the value of the delayed steering angle $\theta sd$ to $(\theta s - \theta L)$ and outputs the value. When the deviation $(\theta s - \theta lpf)$ is equal to or below $(-\theta L)$, the limiting LPF 91 limits the value of the delayed steering angle $\theta sd$ to $(\theta s + \theta L)$ and outputs the value.

Refer to FIG. 8A. The subtracter 92 calculates the absolute value of the deviation angle $\Delta\theta$ between the steering angle $\theta s$ and the delayed steering angle $\theta sd$.

The gain setting unit 93 sets a gain Gv corresponding to the vehicle speed Vv. For example, the gain setting unit 93 may set a greater gain Gv when the vehicle speed Vv is higher. Moreover, for example, the gain setting unit 93 may set a smaller gain Gv when the vehicle speed Vv is higher. In other words, the characteristic of the gain Gv with respect to the vehicle speed Vv can be appropriately changed according to the preference of the user.

The multiplier 94 outputs the product of the absolute value of the deviation angle $\Delta\theta$ multiplied by the gain Gv as the transient component ftr.

Here, an effect of limiting the phase delay of the delayed steering angle $\theta sd$ when limiting the deviation angle $\Delta\theta$ to a limit angle $\theta L$ will be described.

Figure 10A:
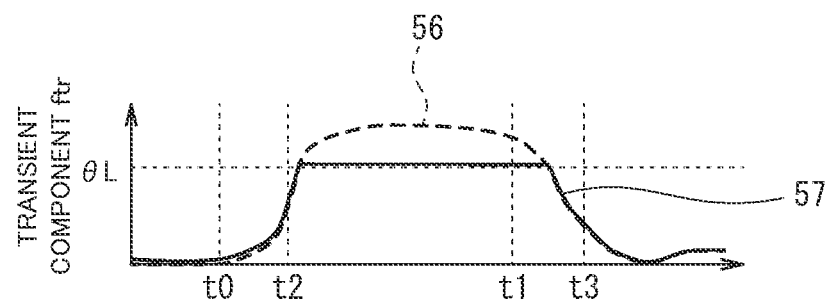
FIG. 10A is a diagram illustrating an example of a transient component when a restriction is imposed using a limiter.
Figure 10B:
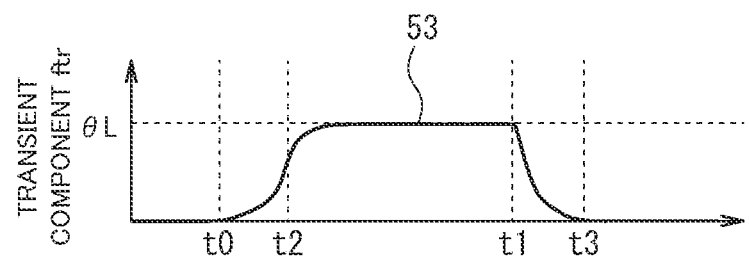
FIG. 10B is a diagram illustrating an example of a transient component when a phase delay of the delayed steering angle is restricted.

FIG. 10A is a reference diagram illustrating an example of limiting the transient component ftr output from the multiplier 94 with a limiter, and a broken line 56 illustrates a transient component ftr before limitation, and a solid line 57 illustrates the transient component ftr whose maximum value is simply limited to the limit angle θL. FIG. 10B is a diagram illustrating an exemplary transient component ftr when the phase delay of the delayed steering angle θsd is restricted.

As illustrated in FIG. 10A, when simply limiting the transient component ftr with a limiter (solid line 57), the start of decreasing of the transient component ftr may be later than time t1 when the steering wheel 31a stops.

As a result, as described above with reference to FIG. 3C, even if the driver tries to stop at the desired steering angle at time t1, the steering reaction force subsequently decreases with a delay, and the driver unexpectedly rotates the steering wheel 31a with the force the driver is applying to the steering wheel to hold the steering wheel 31a, and therefore the steering angle θs may become greater than the driver intended.

On the contrary, when the phase delay of the delayed steering angle θsd is limited as illustrated in FIG. 10B, the transient component ftr can be quickly reduced from time t1 when the steering wheel 31a stops.

As a result, it becomes easier for the driver to stop the steering wheel 31a at the desired steering angle.

Second Embodiment

Figure 11:
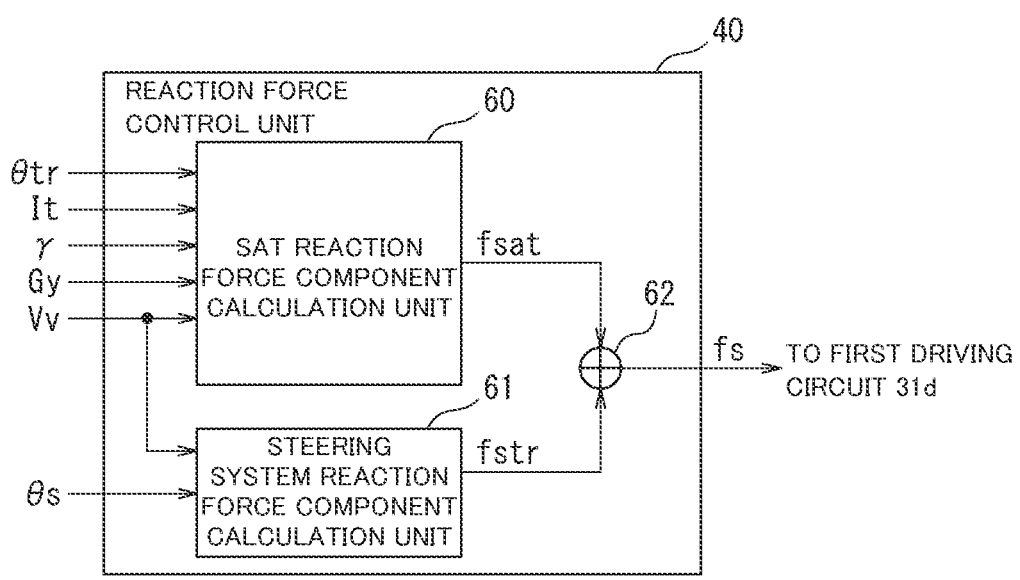
FIG. 11 is a block diagram of an example of a functional configuration of a reaction force control unit according to the second embodiment.

The details of the reaction force control unit 40 according to the second embodiment will be described. FIG. 11 is a block diagram of an exemplary functional configuration of the reaction force control unit 40 according to the second embodiment.

The reaction force control unit 40 according to the second embodiment calculates the first steering reaction force (in other words, the steady component of the steering reaction force) being the reaction force which becomes greater when the steering angle is greater as the SAT, and the second steering reaction force (in other words, the transient component of the steering reaction force) as a component included in the steering system reaction force component fstr.

As described above, the steering system reaction force component fstr is a component simulating steering reaction force due to frictional force acting to the steering unit 31, viscous resistance, torsion of the steering unit 31, and the like.

For example, the reaction force control unit 40 may calculate the steering reaction force due to the torsion of the steering unit 31 among the steering reaction force included in the steering system reaction force component fstr as the second steering reaction force.

The SAT reaction force component calculation unit 60 calculates the SAT reaction force component fsat based on the steering angle θs detected by the steering angle sensor 31e, the vehicle speed Vv detected by the vehicle speed sensor 16, the lateral acceleration Gy detected by the acceleration sensor 17, the yaw rate γ detected by the yaw rate sensor 18, the turning current It detected by the current sensor 32h, and the target turning angle θtr set by the turning control unit 41.

The steering system reaction force component calculation unit 61 calculates the steering system reaction force component fstr based on the steering angle θs and the vehicle speed Vv.

The adder 62 calculates the reaction force command value fs by adding the SAT reaction force component fsat and the steering system reaction force component fstr.

Figure 12A:
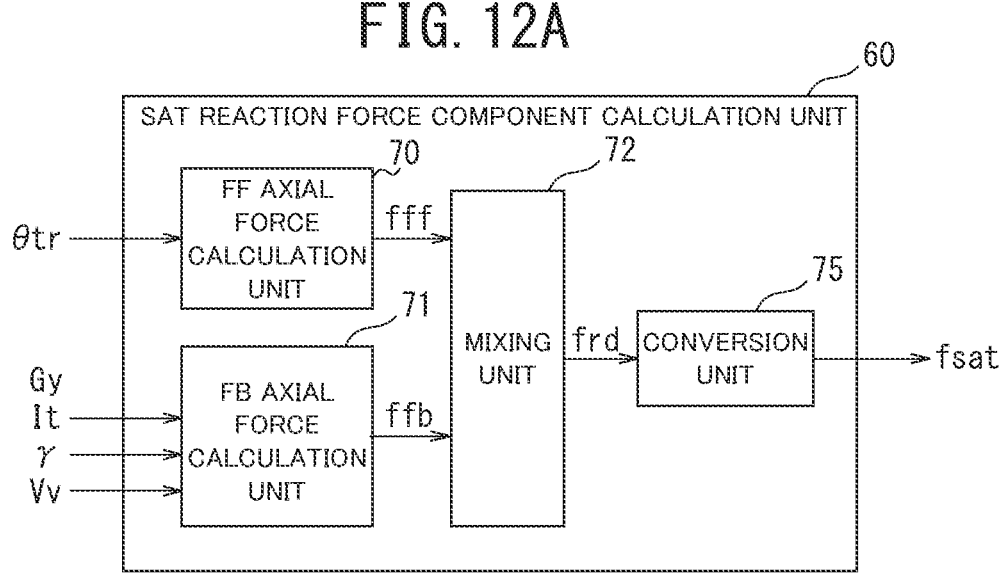
FIG. 12A is a block diagram illustrating an example of a functional configuration of an SAT reaction force component calculation unit according to the second embodiment.

FIG. 12A is a block diagram illustrating an exemplary functional configuration of the SAT reaction force component calculation unit 60 according to the second embodiment.

The functions of the FF axial force calculation unit 70, the FB axial force calculation unit 71, the mixing unit 72 and the conversion unit 75 are the same as the functions of the FF axial force calculation unit 70, the FB axial force calculation unit 71, the mixing unit 72 and the conversion unit 75 according to the first embodiment, respectively.

The road surface component frd output from the mixing unit 72 is converted to the SAT reaction force component fsat by the conversion unit 75.

Figure 12B:
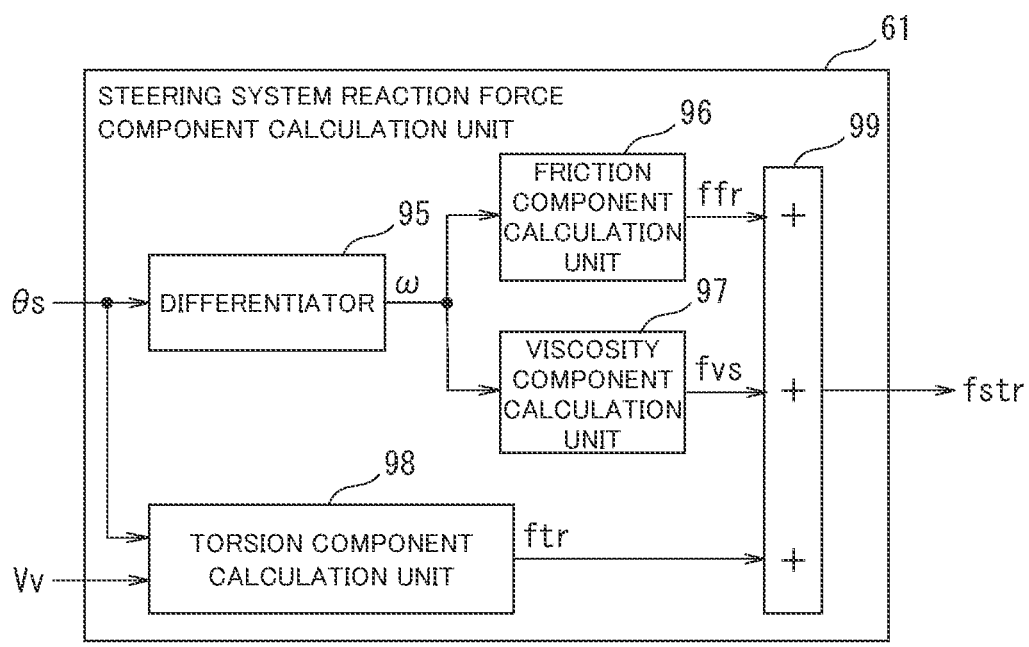
FIG. 12B is a block diagram illustrating an example of a functional configuration of a steering system reaction force component calculation unit according to the second embodiment.

FIG. 12B is a block diagram illustrating an exemplary functional configuration of a steering system reaction force component calculation unit 61 according to the second embodiment.

The steering system reaction force component calculation unit 61 includes a differentiator 95, a friction component calculation unit 96, a viscosity component calculation unit 97, a torsion component calculation unit 98, and an adder 99.

The differentiator 95 calculates the steering angular velocity ω by differentiating the steering angle θs.

The friction component calculation unit 96 calculates the friction component ffr based on the steering angular velocity ω. The friction component ffr is a component simulating the steering reaction force due to frictional force acting to the steering unit 31.

The viscosity component calculation unit 97 calculates a viscosity component fvs based on the steering angular velocity ω. The viscosity component fvs is a component simulating the steering reaction force due to viscous resistance acting to the steering unit 31.

The torsion component calculation unit 98 calculates the torsion component ftr as the second steering reaction force (a transient component of the steering reaction force), based on the steering angle θs and the vehicle speed Vv. The torsion component ftr is a component simulating the steering reaction force due to the torsion of the steering unit 31.

The configuration and the function of the torsion component calculation unit 98 is similar to the transient component calculation unit 73 according to the first embodiment, described with reference to FIG. 8A.

In other words, the torsion component calculation unit 98 calculates a delayed steering angle θsd in which a phase is delayed with respect to the steering angle θs, and calculates a torsion component ftr based on a deviation angle Δθ=θs−θsd being a deviation between the steering angle θs and the delayed steering angle θsd.

The adder 99 calculates the steering system reaction force component fstr by adding the friction component ffr, the viscosity component fvs, and the torsion component ftr.

Third Embodiment

The reaction force control unit 40 according to the third embodiment calculates the SAT reaction force component fsat including the second steering reaction force (in other words, the transient component of the steering reaction force) and the steering system reaction force component fstr including the second steering reaction force.

For example, the reaction force control unit 40 according to the third embodiment may calculate the second steering reaction force including the steering reaction force due to the torsion during turning of a member (the steered wheels 34, a suspension, and the like) closer to the road surface than the steering rack 32*d* and the steering reaction force due to the torsion of the steering unit 31 and the like.

The reaction force control unit 40 according to the third embodiment may calculate the steering reaction force due to the road surface reaction force received by the steered wheels 34 form a road surface as the first steering reaction force.

For example, the reaction force control unit 40 according to the third embodiment includes the SAT reaction force component calculation unit 60 according to the first embodiment, and a steering system reaction force component calculation unit 61 according to the second embodiment, and may calculate the reaction force command value fs by adding the SAT reaction force component fsat and the steering system reaction force component fstr output from the SAT reaction force component calculation unit 60 and the steering system reaction force component calculation unit 61, respectively.

Effect of the Embodiment (1) The steering angle sensor 31*e* detects the steering angle $\theta s$ of the steering wheel 31*a*. The reaction force control unit 40 calculates the first steering reaction force which becomes greater when the steering angle $\theta s$ is greater, calculates the delayed steering angle $\theta sd$ in which the phase is delayed with respect to the steering angle $\theta s$, and calculates the second steering reaction force which becomes greater when the absolute value of the deviation angle $\Delta\theta$ being a deviation of the steering angle $\theta s$ and the delayed steering angle $\theta sd$ is greater. The reaction force actuator 31*c* applies the steering reaction force based on the sum of the first steering reaction force and the second steering reaction force to the steering wheel 31*a*.

As a result, when the steering wheel 31*a* is being transitioned to a steering holding state, the steering reaction force can be maintained at an appropriate magnitude until the steering wheel 31*a* is stopped at the desired steering angle. When the steering wheel 31*a* stops, the steering reaction force quickly reduces and converges. As a result, the steering wheel 31*a* becomes easier to stop.

(2) The reaction force control unit 40 may limit the absolute value of the deviation angle $\Delta\theta$ to be equal to or below the limit angle $\theta L$.

As a result, the second steering reaction force can be prevented from becoming excessive.

(3) The reaction force control unit 40 may limit the absolute value of the deviation angle $\Delta\theta$ to be equal to or below the limit angle $\theta L$ by controlling the phase of the delayed steering angle $\theta sd$.

As a result, even when the absolute value of the deviation angle $\Delta\theta$ is limited, it is possible to prevent the delay in the start of decrease in the second steering reaction force from the time when the steering wheel 31*a* stops. Therefore, the driver can easily hold the steering wheel 31*a* in a desired position because the transient component ftr can be quickly decreased from the time when the steering wheel 31*a* stops.

(4) The reaction force control unit 40 may set a greater value as the limit angle $\theta L$ when the vehicle speed Vv is greater.

(5) The reaction force control unit 40 may set a constant value as the limit angle $\theta L$ when the vehicle speed Vv is equal to or above a threshold value V1.

As a result, an appropriate upper limit of the second steering reaction force can be set according to the vehicle speed Vv.

(6) The reaction force control unit 40 may calculate the second steering reaction force based on a product of the gain Gv that becomes greater when the vehicle speed is higher and the absolute value of the deviation angle. As a result, the second steering reaction force can be increased according to the vehicle speed Vv.

(7) The reaction force control unit 40 may calculate the delayed steering angle $\theta sd$ by delaying the phase of the steering angle $\theta s$ using a low pass filter. As a result, the delayed steering angle $\theta sd$ being delayed in the phase with respect to the steering angle $\theta s$ can be calculated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

11 Controller
16 Vehicle speed sensor
17 Acceleration sensor
18 Yaw rate sensor
20 Processor
21 Storage
31 Steering unit
31*a* Steering wheel
31*b* Column shaft
31*c* Reaction force actuator
31*d* First driving circuit
31*e* steering angle sensor
31*f*, 32*h* Current sensors
32 Turning unit
32*a* Pinion shaft
32*b* Steering gear
32*c* Rack gear
32*d* Steering rack
32*e* Turning actuator
32*f* Second driving circuit
32*g* Turning angle sensor
33 Backup clutch
34 Steered wheels
40 Reaction force control unit
41 Turning control unit
60 SAT reaction force component calculation unit
61 Steering system reaction force component calculation unit
62, 74, 99 Adders
70 Feedforward axial force calculation unit
71 Feedback axial force calculation unit
72 Mixing unit
73 Transient component calculation unit
75 Conversion unit
90 Limit angle setting unit
91 Limiting low pass filter
92 Subtracter
93 Gain setting unit 94 Multiplier
95 Differentiator
96 Friction component calculation unit
97 Viscosity component calculation unit
98 Torsion component calculation unit

The invention claimed is:

1. A steering control method comprising:
   detecting a steering angle of a steering wheel;
   calculating first steering reaction force that becomes greater when the detected steering angle is greater;
   calculating a delayed steering angle by delaying a phase of the detected steering angle using a low pass filter;
   calculating a deviation angle as a deviation between the detected steering angle and the calculated delayed steering angle;
   calculating second steering reaction force that becomes greater when an absolute value of the deviation angle is greater, wherein the absolute value of the deviation angle is limited to be equal to or less than a predetermined value, and wherein the predetermined value is a fixed value when vehicle speed is equal to or above a threshold value; and
   applying steering reaction force based on a sum of the first steering reaction force and the second steering reaction force to the steering wheel.

2. The steering control method according to claim 1, wherein the absolute value of the deviation angle is limited to be equal to or lower than the predetermined value by controlling a phase of the delayed steering angle.

3. The steering control method according to claim 1, wherein a greater value is set as the predetermined value when the vehicle speed is greater.

4. The steering control method according to claim 1, wherein the second steering reaction force is calculated based on a product of a gain the becomes greater when the vehicle speed is greater and the absolute value of the deviation angle.

5. A steering control device comprising:
   a sensor configured to detect a steering angle of a steering wheel;
   a controller configured to:
      calculate first steering reaction force that becomes greater when the steering angle detected by the sensor is greater;
      calculate a delayed steering angle by delaying a phase of the steering angle using a low pass filter;
      calculate a deviation angle as a deviation between the detected steering angle and the calculated delayed steering angle;
      calculate second steering reaction force that becomes greater when an absolute value of the deviation angle is greater, wherein the absolute value of the deviation angle is limited to be equal or less than a predetermined value, and wherein the predetermined value is a fixed value when vehicle speed is equal to or above a threshold value; and
      calculate total steering reaction force by adding the first steering reaction force and the second steering reaction force; and
   an actuator configured to apply steering reaction force based on the total steering reaction force to the steering wheel.

* * * * *